(12) United States Patent
Addicott

(10) Patent No.: US 6,755,456 B2
(45) Date of Patent: Jun. 29, 2004

(54) MOUNTING ASSEMBLY FOR A TRUCK BED COVER

(76) Inventor: Simon T. Addicott, 4575 Treat Hwy., Adrian, MI (US) 49221

( * ) Notice: Subject to any disclaimer, the term of this patent is extended or adjusted under 35 U.S.C. 154(b) by 0 days.

(21) Appl. No.: 10/411,474

(22) Filed: Apr. 10, 2003

(65) Prior Publication Data
US 2003/0193210 A1 Oct. 16, 2003

Related U.S. Application Data
(60) Provisional application No. 60/371,779, filed on Apr. 11, 2002.

(51) Int. Cl.[7] .................................................. B60P 7/02
(52) U.S. Cl. ............................ 296/100.07; 296/100.06; 296/100.08
(58) Field of Search ........................... 296/26.03, 26.08, 296/26.09, 26.12, 26.13, 37.6, 100.02, 100.04, 100.05, 100.06, 100.07, 100.08, 100.1

(56) References Cited

U.S. PATENT DOCUMENTS

| | | | | |
|---|---|---|---|---|
| 3,572,821 A | * | 3/1971 | Van Antwerp | 296/100.02 |
| 4,261,611 A | * | 4/1981 | Barry et al. | 296/100.07 |
| 5,503,450 A | * | 4/1996 | Miller | 296/100.08 |
| 5,988,472 A | * | 11/1999 | McPhail et al. | 296/100.02 |
| 6,217,102 B1 | * | 4/2001 | Lathers | 296/100.07 |
| 6,588,826 B1 | * | 7/2003 | Muirhead | 296/100.07 |
| 2002/0053811 A1 | * | 5/2002 | Myers | 296/100.02 |

* cited by examiner

Primary Examiner—Lori L. Coletta
(74) Attorney, Agent, or Firm—Gifford, Krass, Groh, Sprinkle, Anderson & Citkowski, P.C.

(57) ABSTRACT

The present invention provides an adjustable mounting assembly for use with a truck having a truck bed cover. Generally, the assembly includes hinge couplings that are detachedly fixed to a truck bed cover support frame. The hinge couplings hingedly attach to a lower hinge bar detachedly secured to the top edge of the truck bed cab wall. The lower hinge assembly provides a support channel for a base portion of first and second L-shaped hinge rails. The support channel allows the installer to adjust the hinge rails to the width of the track bed in which the assembly is being installed. Clamp assemblies are provided to fasten the elongated portions of the hinge rails to the side walls of the truck bed whereby the mounting assembly is secured to the truck bed without having to drill mounting holes. The hingedly attached truck bed cover moves pivotally about a pivot point along the top edge of the truck bed cab wall. The mounting assembly provides increased accessibility to the cargo area beyond that provided by conventional devices used to install truck bed covers.

9 Claims, 1 Drawing Sheet

MOUNTING ASSEMBLY FOR A TRUCK BED COVER

RELATED APPLICATION

This application claims priority of U.S. Provisional Patent Application No. 60/371,779 filed Apr. 11, 2002 and is incorporated herein by reference.

FIELD OF THE INVENTION

The present invention relates generally to support frames for truck bed covers.

BACKGROUND OF THE INVENTION

Pick-up truck bed covers are popular among truck owners not only because of their ability to enhance the appearance of the truck but also to provide a level of protection for items contained in the truck bed that may be noticed by would-be thieves or simply to provide protection from the elements.

Most covers are designed to allow the user to have a degree of access to the truck bed compartment when the cover is installed and it is desirable for the cover to be easily installed and removable from the truck bed. Some covers are designed to be fixably attached to the truck bed such that access to the cargo area is limited to access through the tailgate opening when a bed cover is installed. Other designs use a hinge assembly that allows at least a portion of the bed cover to be pivotally opened and closed about a hinged edge such that access to the cargo area can be had through a portion of the bed cover as well as the tailgate. Typically, the attachment means used for installation requires through holes to be made in the truck bed such as those made by power or hand drilling.

There is a need for an apparatus that allows the user to have greater access to the cargo area of a pick-up truck when a conventional truck bed cover is installed beyond just having access through an open tailgate and/or a portion of the bed cover. Accordingly, Applicant has addressed this need by providing an adjustable truck bed cover mounting assembly that can be adapted for use with a number of truck beds of different sizes. The mounting assembly provides a hinged portion that attaches to the truck bed cover allowing increased access to the cargo area of the truck bed when a cover is installed and open about the hinged point.

SUMMARY OF THE INVENTION

The present invention provides an adjustable bed frame assembly for use with a truck having a truck bed and a truck bed cover. The truck bed has first and second side walls, a cab wall and a tailgate surrounding the bed floor.

A truck bed cover is mounted on a cover support frame wherein the support frame has side sections dimensioned to extend along and adjacent to the side walls of the truck bed, a cab wall section adjacent to the cab wall and a tailgate section adjacent the tailgate. Preferably, the perimeter of the truck bed cover support frame is substantially equivalent to the perimeter of the truck bed walls, including the tailgate.

An adjustable frame assembly includes first and second L-shaped hinge rails having elongated portions dimensioned to extend along a length of the side walls and a base portion that extends from the side walls and along the cab wall.

At least one lower hinge bar is detachably mounted on the cab wall. The hinge bar has upper and lower portions wherein the lower portion has a channel that slidably receives the base portions of the L-shaped hinge rails such that the hinge rails move perpendicularly relevant to the side walls when it is desired to adjust the width of the bed frame to be substantially equivalent to the width of the particular truck bed for which the frame is being installed. Once adjusted, the base portions of the hinge rails are fastened in place with a retaining means such as with set screws, peg in hole, cotter pinned, or the like.

A plurality of clamp assemblies operate to fasten the elongated portions of the first and second hinge rails to the side walls of the truck bed at discrete points along the side wall. Each clamp assembly has front and back plates, a means to couple the front and back plates, and a means of retaining the clamp assembly at a discrete point on the elongated portion of the hinge rail. The retaining means may be set screws, peg in hole, cotter pinned, or the like.

Finally, at least one hinge bar coupling is detachably fixed to the cover support frame on the cab wall section such that alignment with the lower hinge bar mounted on the cab wall is realized. In this manner the hinge bar coupling and the lower hinge bar can be hingedly attached through use of a retaining means such as a hinge pin.

In operation the user hingedly pivots the truck bed cover about the pivot point arranged along a top edge of the cab wall such that access to the cargo area can be had through the open tailgate as well as over the side walls of the truck bed. A support piston may be included to operate to hold the truck bed cover and support frame in an open position until the user chooses to close it.

BRIEF DESCRIPTION OF THE DRAWINGS

A better understanding of the present will be had upon reference to the following detailed description when read in conjunction with the accompanying drawing wherein like reference characters refer to like parts in which.

DETAILED DESCRIPTION OF A PREFERRED EMBODIMENT

Figure 1:
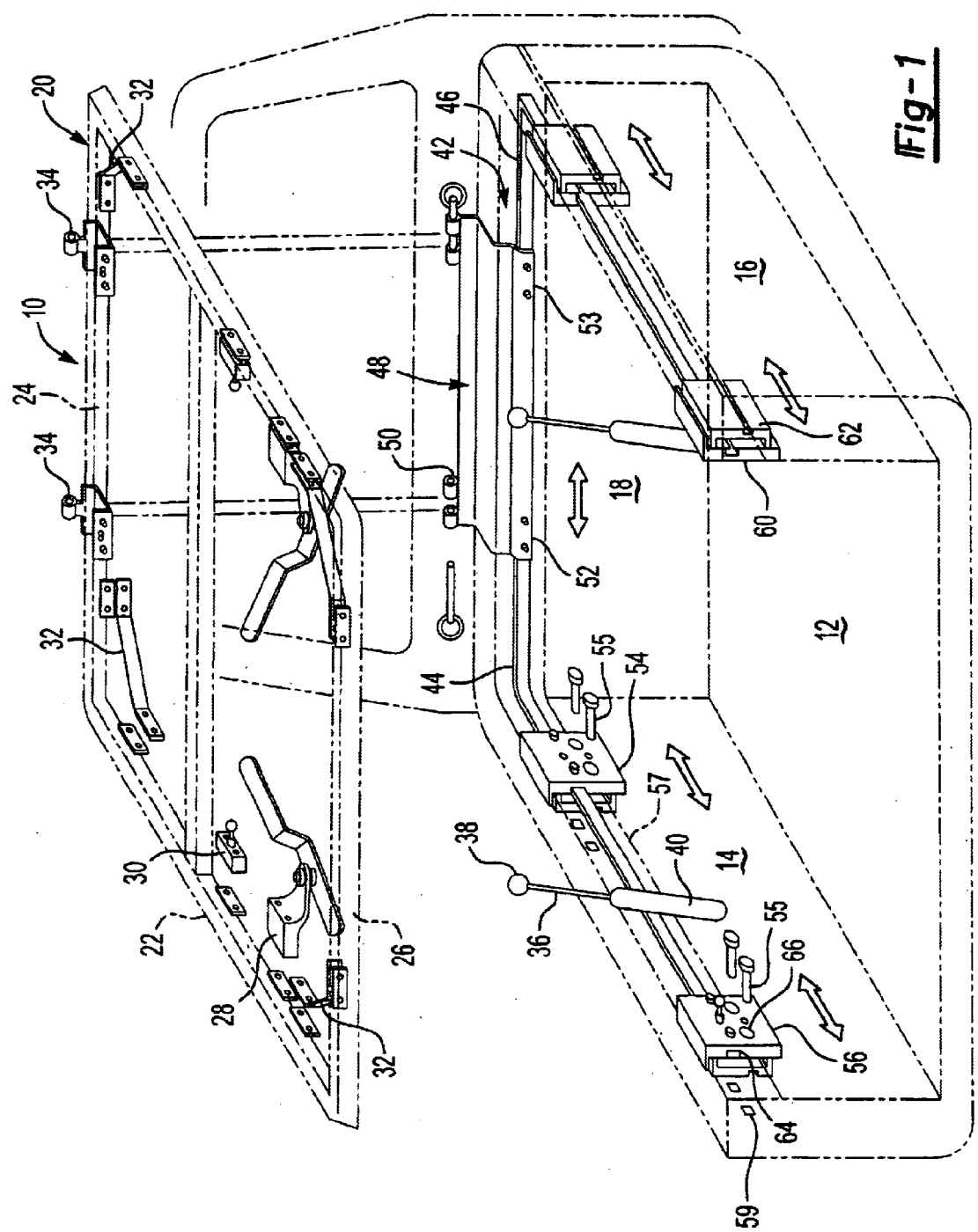
FIG. 1 is a view illustrating a preferred embodiment of the adjustable truck bed cover mounting assembly as according to the invention.

The present invention provides an adjustable mounting assembly 10 for use with a truck having a truck bed cover. As best illustrated by the preferred embodiment in FIG. 1, a truck bed having a truck bed cover and cover support frame 20 is shown in phantom lines. The truck bed 12 includes a first side wall 14, a second side wall 16, a cab wall 18, and a tailgate (not shown).

A conventional truck bed cover is mounted to the cover support frame 20 via a conventional fastening means used for such purpose such as snaps or Velcro hook and loop fastener. The truck bed cover may be made from various materials including cloth, animal hide or synthetic material suited for such purpose.

The cover support frame 20 includes sections 22 that extend along and adjacent the side walls of the truck bed, a cab wall section 24 and a tailgate section 26 all tied together such that the frame perimeter is substantially equivalent to that of the truck bed 12 to completely cover the cargo area when installed.

Additionally, the cover support frame 20 includes at least one hinge bar coupling 34 detachedly fixed on the cab wall section 24 of the support frame 20.

The mounting assembly 10 comprises an adjustable bed frame 42 detachedly fixed to the truck bed walls via a fastening means to be described hereinafter. The bed frame includes a first L-shaped hinge rail 44 and a second L-shaped hinge rail 46 wherein each rail has an elongated portion that extends along the length of the side walls and a base portion that extends from the side walls along the cab wall 18. It is understood that other types of rails may be used such as a single U-shaped rail, straight rails that extend along the side walls only, or other forms without exceeding the scope of the invention.

A lower hinge bar 48 is detachedly mounted to the top edge of the cab wall 18. The hinge bar 48 includes an upper 50 and lower portion 52. The upper portion 50 of the hinge bar 48 hingedly attaches to the hinge bar coupling 34 attached to the cover support frame. It is understood that proper alignment between the lower hinge bar 48 and the at least one-hinge bar coupling 34 is realized during installation to ensure proper operation of the installed mounting assembly 10. The lower portion 52 of the lower hinge bar 48 includes a channel to slidably receive and support the base portion of the L-shaped hinge rails, 44 and 46 respectively, such that the rails may be moved perpendicularly relative to the side walls. In this manner the hinge rails may be adjusted to a desired width substantially equivalent that of a particular truck bed in which the mounting assembly 10 is installed. The lower hinge bar 48 may include a retaining means 53 for fastening the hinge rails at the adjusted location such as set screws, peg in hole, cotter pinned, or the like.

To support the elongated portions of the hinge rails on the side walls, front 54 and rear 56 clamp assemblies are provided. The front clamp assemblies 54 fasten a point on the elongated portion of the hinge rails 44, and 46 respectively, to a point on each of the side walls near the cab wall 18. The rear clamp assemblies 56 fasten a second point along the elongated portion of the hinge rails to a point on each of the side walls near the tailgate of the truck bed 12. The clamp assemblies include front 60 and back plates 62 clamped together through a coupling means. The front plate includes a channel 64 for receiving the elongated portion of the L-shaped hinge rails, a retaining means for fastening the clamp at a position on the hinge rail, and through holes 66 that allow the coupling means to pass through the front plate 60 to through holes in the back plate 62. In this case the coupling means is a nut 59 and bolt 55 combination that allows the user to clamp the front 60 and back plates 62 to a skirt 57 that extends down from the inside top edge of the side walls. Once tightened about the skirt 57, the clamp assemblies securely attach the mounting assembly to the truck bed 12 without the need for making through holes in the truck bed walls by drilling to facilitate installation.

During installation, the hinge bar couplings 34 are secured to the cover support frame 20 and properly aligned with the lower hinge bar 48 mounted on the cab wall 18 of the truck bed 12. A hinge pin is used to fasten the hinged parts together such that the truck bed cover can be pivotally moved about a pivot point at the top edge of the cab wall 18 to an open or closed position.

The adjustable bed frame 42 allows the user to adapt the mounting assembly 10 to a variety of truck bed sizes by simply adjusting the hinge rails to the desired width of a truck bed and fastening them in place with the retaining means and the clamp assemblies.

To add to the utility of the mounting assembly, a support piston cylinder 36 is attached between the cover support frame 20 and the bed frame 42 such that when the truck bed cover is extended to the open position it remains open until the user desires to close it. Preferably a mounting point 30 is provided on a side section of the cover support 20 and a second mounting point 58 is provided on a clamp assembly such that a first end 38 of the support piston cylinder 36 attaches to the mounting point 30 on the support frame 20 and a second end 40 of the cylinder 36 attaches to the mounting point 58 on the clamp assembly.

Latch assemblies 28 may be provided and detachedly fixed to the cover support frame 20 for the purpose of securing the truck bed cover to the truck bed walls when not accessing the cargo area.

Additionally, corner braces 32 may be utilized with the cover support frame 20 to enhance its rigidity and durability for use with the mounting assembly 10.

From the foregoing, it can be seen that the present invention provides a simple and yet highly effective adjustable mounting assembly for use in a plurality of truck beds having varying widths to allow a user to have increased accessibility to the cargo area when the truck bed cover is installed. Having described the invention, however, many modifications thereto will become apparent to those skilled in the art to which it pertains without deviation from the spirit of the invention as defined by the scope of the appended claims.

I claim:

1. An adjustable bed frame assembly for use with a truck having a truck bed, said truck bed having first and second side walls, a cab wall, a tailgate and a truck bed cover, said truck bed cover being mounted on a cover support frame, said support frame having side sections extending adjacent said side walls, a cab wall section adjacent said cab wall, and a tailgate section adjacent said tailgate, said frame assembly comprising:

first and second L-shaped hinge rails, said hinge rails having an elongated portion that extends along the length of the side walls and a base portion that extends from the side walls along the cab wall;

at least one lower hinge bar detachedly mounted on the cab wall, said lower hinge bar having upper and lower portions, said lower portion having a channel to slidably receive said base portions of the L-shaped hinge rails such that the hinge rails move perpendicularly relative to the side walls;

a plurality of clamp assemblies that operate to fasten the elongated portions of the first and second hinge rails to the sidewalls; and at least one hinge bar coupling detachedly fixed to the cover support frame whereby said coupling is hingedly attached to said at least one lower hinge bar with a hinge pin.

2. The frame assembly of claim 1 wherein said plurality of clamp assemblies include at least one front and at least one rear clamp assembly, said front clamp assembly fastens the elongated portion to a point on the sidewall near the cab wall, said second clamp assembly fastens the elongated portion to a point on the sidewall near said tailgate.

3. The frame assembly of claim 2 further including at least one support piston cylinder fastened at one end to the support frame and at the other end to said rear clamp assembly.

4. The frame assembly of claim 1 further including at least one latch assembly for detachedly fastening the cover support frame to the truck bed.

5. The frame assembly of claim 1 where in the cover support frame includes corner braces that operate to reinforce the support frame.

6. A mounting assembly for use with a truck having a truck bed, said truck bed having first and second side walls, a cab wall, a tailgate, and a truck bedcover, said truck bedcover being mounted on a cover support frame, said support frame having side sections extending adjacent said side walls, and a cab wall section adjacent said cab wall, said mounting assembly comprising:

at least one hinge bar coupling detachedly fixed on said portion of the support frame extending along the cab wall; and an adjustable bed frame having:

first and second L-shaped hinge rails, said hinge rails having an elongated portion that extends along the length of the side walls and a second portion that extends from the side walls along the cab wall;

at least one lower hinge bar detachedly mounted on the cab wall, said lower hinge bar having upper and lower portions, said upper portion hingedly attaches to said at least one hinge bar coupling, said lower portion including a channel that slidably receives said base portion of the L-shaped hinge rails such that the rails move perpendicularly relative to the sidewalls; and front and rear clamp assemblies, said front clamp assemblies operate to fasten the elongated portion of the hinge rails to a point on the sidewalls near the cab wall, said second clamp assemblies fasten the elongated portion of the hinge rails to a point on the sidewalls near said tailgate.

7. The mounting assembly of claim 6 further including at least one support piston cylinder fastened at one end to a mounting point on the support frame and at the other end to a mounting point on said rear clamp assembly.

8. The mounting assembly of claim 6 further including at least one latch assembly for detachedly fastening the cover support frame to the truck bed.

9. The mounting assembly of claim 6 wherein the cover support frame includes corner braces that operate to reinforce the support frame.

* * * * *